United States Patent
Wu et al.

(10) Patent No.: US 12,484,318 B2
(45) Date of Patent: Nov. 25, 2025

(54) CMOS IMAGE CHIP, CAMERA THEREOF, AND DEBUGGING METHOD THEREOF

(71) Applicant: Suzhou China Star Optoelectronics Technology Co., Ltd., Jiangsu (CN)

(72) Inventors: Hao Wu, Jiangsu (CN); Wenbing Zhang, Jiangsu (CN); Feng Gao, Jiangsu (CN); Zhenhua Rao, Jiangsu (CN); Yufei Xia, Jiangsu (CN)

(73) Assignee: Suzhou China Star Optoelectronics Technology Co., Ltd., Suzhou (CN)

( * ) Notice: Subject to any disclaimer, the term of this patent is extended or adjusted under 35 U.S.C. 154(b) by 0 days.

(21) Appl. No.: 17/796,654

(22) PCT Filed: Jul. 29, 2022

(86) PCT No.: PCT/CN2022/108959
§ 371 (c)(1),
(2) Date: Jul. 31, 2022

(87) PCT Pub. No.: WO2024/011670
PCT Pub. Date: Jan. 18, 2024

(65) Prior Publication Data
US 2024/0186358 A1   Jun. 6, 2024

(30) Foreign Application Priority Data
Jul. 12, 2022  (CN) .......................... 202210821963.2

(51) Int. Cl.
*H10F 39/18* (2025.01)
*H01L 25/16* (2023.01)
(Continued)

(52) U.S. Cl.
CPC ........... *H10F 39/18* (2025.01); *H01L 25/167* (2013.01); *H04N 17/002* (2013.01);
(Continued)

(58) Field of Classification Search
CPC .... H10F 39/18; H10F 39/8063; H10F 39/811; H10F 39/8057; H01L 25/167; H04N 17/002
See application file for complete search history.

(56) References Cited

U.S. PATENT DOCUMENTS 10,816,939 B1 * 10/2020 Coleman ................. G01S 17/86
2005/0110161 A1 * 5/2005 Naito ...................... H01L 24/16
257/E23.068
(Continued)

FOREIGN PATENT DOCUMENTS

| CN | 1828868 | 9/2006 |
|---|---|---|
| CN | 1992322 | 7/2007 |

(Continued)

OTHER PUBLICATIONS

Notification of Office Action and Search Report Dated Oct. 30, 2024 From the National Intellectual Property Agency of the People's Republic of China Re. Application No. 202210821963.2 and Its Translation Into English. (27 Pages).
(Continued)

*Primary Examiner* — Norman D Richards
*Assistant Examiner* — Sean Ayers Winters

(57) ABSTRACT

The present invention relates to a CMOS image chip, a camera, thereof, and a debugging method thereof. The CMOS image chip of the present invention disposes light emitting diodes in a light emitting region and uses a projection pattern of the light emitting diodes on a substrate to be inspected to determine a photosensitive effective region of the CMOS image chip on the underlay to prevent the issue that the conventional technology uses an image by camera imaging on a display device as debug basis and a camera
(Continued)

imaging image has signal delay to result in a low debugging efficiency, which drastically improves a debugging efficiency of the camera.

10 Claims, 7 Drawing Sheets

(51) Int. Cl.
  *H04N 17/00* (2006.01)
  *H10F 39/00* (2025.01)
(52) U.S. Cl.
  CPC ..... *H10F 39/8057* (2025.01); *H10F 39/8063* (2025.01); *H10F 39/811* (2025.01)

(56) References Cited

U.S. PATENT DOCUMENTS

| | | | |
|---|---|---|---|
| 2006/0102938 A1 | 5/2006 | Park | |
| 2008/0224162 A1* | 9/2008 | Min | H10H 20/857 257/E33.061 |
| 2008/0265296 A1 | 10/2008 | Uya | |
| 2019/0348457 A1* | 11/2019 | Park | H10F 39/8063 |
| 2021/0005761 A1* | 1/2021 | Tsai | H01L 25/165 |

FOREIGN PATENT DOCUMENTS

| | | |
|---|---|---|
| CN | 101221964 | 7/2008 |
| CN | 108281435 | 7/2018 |
| CN | 109872986 | 6/2019 |
| CN | 110085653 | 8/2019 |
| JP | 08-32848 | 2/1996 |
| TW | 201031988 | 9/2010 |

OTHER PUBLICATIONS

International Search Report and the Written Opinion Dated Dec. 21, 2022 From the International Searching Authority Re. Application No. PCT/CN2022/108909 and Its Translation Into English. (18 Pages).

* cited by examiner

CMOS IMAGE CHIP, CAMERA THEREOF, AND DEBUGGING METHOD THEREOF

RELATED APPLICATIONS

This application is a National Phase of PCT Patent Application No. PCT/CN2022/108959 having International filing date of Jul. 29, 2022, which claims the benefit of priority of Chinese Patent Application No. 202210821963.2 filed on Jul. 12, 2022. The contents of the above applications are all incorporated by reference as if fully set forth herein in their entirety.

FIELD AND BACKGROUND OF THE INVENTION

The present application relates to a field of display technologies, especially to a complementary metal-oxide-semiconductor (CMOS) image chip, a camera thereof, and a debugging method thereof.

Most conventional image formation chips used by industrial cameras are back-illuminated complementary metal-oxide-semiconductor (CMOS) image sensor (CIS) chips. The CIS chip has advantages such as small size and low power consumption and are applied extensively.

Technical Issue

An optical system of a traditional inspection apparatus is securely mounted. After debugging is completed, to maintain stability of a camera, the camera and a light source are generally placed and seldom remove positions and change a distance thereof. However, although theoretical calculated values of a camera debugging process can be referred to, it should be based on a debug basis of an image formed on the display device by camera imaging. Also, because the camera imaging image has signal delay during a transmission process, a debugging efficiency of the camera is lower. Especially, debug for experimental apparatus requires frequent switch of camera types, replacement of lenses, adjustment of positions of the camera and the light source. A low efficiency of the of the debugging process the camera results in a low experimental efficiency.

SUMMARY OF THE INVENTION

Technical Solution

An objective of the present invention is to provide a complementary metal-oxide-semiconductor (CMOS) image chip, a camera thereof, and a debugging method thereof that can solve an issue that a conventional requires to use an image formed by camera imaging on a display device as a debug basis, and the camera imaging image has signal delay during a transmission process to result in a lower camera debugging efficiency.

To solve the above issue, the present invention provides a CMOS image chip, comprising: a photosensitive region and a light emitting region surrounding the photosensitive region; wherein the CMOS image chip comprises: a circuit layer located in the photosensitive region and the light emitting region; a plurality of photodiodes disposed on the circuit layer of the photosensitive region and electrically connected to the circuit layer; and a plurality of the light emitting diodes disposed on the circuit layer of the light emitting region and electrically connected to the circuit layer.

Furthermore, an underlay is disposed on the circuit layer in the photosensitive region, and the photodiodes are disposed on the underlay of the photosensitive region.

Furthermore, the underlay is further disposed on the circuit layer in the light emitting region, the underlay in the light emitting region comprises a first aperture, and the light emitting diodes are located in the first aperture.

Furthermore, the light emitting diodes are Micro light emitting diode (LEDs) or Mini LEDs.

Furthermore, each of the light emitting diodes comprises: a substrate, a light emitting layer disposed on a side of the substrate toward the circuit layer, a P-electrode and a N-electrode disposed on a side of the light emitting layer away from the substrate at an interval; and wherein the circuit layer corresponding to the first aperture comprises a first electrode and a second electrode electrically connected to the P-electrode and the N-electrode respectively.

Furthermore, each of the light emitting diodes further comprises a protrusion metal disposed between the P-electrode and the first electrode and disposed between the N-electrode and the second electrode.

Furthermore, a surface of a side of the light emitting layer of one of the light emitting diodes away from the circuit layer is flush with a surface of a side of the underlay away from the circuit layer.

Furthermore, the CMOS image chip further comprises: an anti-reflection layer disposed on a side of the underlay away from the circuit layer; a second aperture is defined between adjacent two of the photodiodes, and the anti-reflection layer is further filled in the second aperture; and an encapsulation layer filled in the first aperture; wherein surfaces of sides of the encapsulation layer, the light emitting diodes, and the anti-reflection layer away from the circuit layer are flush with one another.

Furthermore, the CMOS image chip further comprises: a metal grid disposed on a portion of a side of the anti-reflection layer away from the circuit layer corresponding to the second aperture; a first planarization layer disposed on a side of the anti-reflection layer, the light emitting diodes and the encapsulation layer away from the circuit layer; a color resist unit disposed on a side of the first planarization layer between adjacent portions of the metal grid away from the circuit layer; a second planarization layer disposed on a side of the color resist unit and the first planarization layer away from the circuit layer; and a plurality of lens elements disposed on a side of the second planarization layer away from the circuit layer and disposed opposite to the color resist unit and the light emitting diodes.

Furthermore, a length of bottom edge of a side of the first aperture near the circuit layer is less than a length of a bottom edge of a side of the first aperture away from the circuit layer.

To solve the above issue, the present invention provides a camera, comprising a complementary metal-oxide-semiconductor (CMOS) image chip and a lens of the present invention; wherein the camera comprises one of an area array camera and a linear array camera.

To solve the above issue, the present invention provides a camera debugging method of the present invention, comprising steps of follows: projecting a display image of the light emitting diodes of the CMOS image chip through the lens and to a substrate to be inspected to form a projection pattern, observing a clarity of the projection pattern on the substrate to be inspected and adjusting a focus length of the lens by a user, wherein the user observes a clarity of a plurality of point positions of the projection pattern of the substrate to be inspected and adjusts a level of the camera.

Furthermore, when the camera is the linear array camera, the method further comprises a step as follows: by the user observing a position of reflective light from light emitted from the light emitting diodes reflected by the substrate to be inspected, determining a placement position and an angle of a light source, and adjusting a bright and dark field imaging mode of the camera.

Advantages

The CMOS image chip of the present invention comprises a photosensitive region and a light emitting region surrounding the photosensitive region. A plurality of the light emitting diodes, are disposed in the light emitting region. According to a principle of reversibility of light, a projection pattern of the light emitting diodes on a substrate to be inspected is used to determine a photosensitive effective region of an underlay of a CMOS image chip to prevent the issue that the conventional technology uses an image by camera imaging on a display device as debug basis and a camera imaging image has signal delay to result in a low debugging efficiency.

A display image of the light emitting diodes of the CMOS image chip of the present invention is projected through the lens and to a substrate to be inspected to form a projection pattern, a user observes a clarity of the projection pattern on the substrate to be inspected and adjusting a focus length of the lens, and observes a clarity of a plurality of point positions of the projection pattern of the substrate to be inspected and adjusts a level of the camera When the camera is a linear array camera, the user can also observe a position of reflective light from light emitted by the light emitting diodes reflected by the substrate to be inspected, determine a placement position and an angle of a light source, and adjust a bright and dark field imaging mode of the camera.

BRIEF DESCRIPTION OF THE SEVERAL VIEWS OF THE DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may also acquire other figures according to the appended figures without any creative effort.

Figure 1:
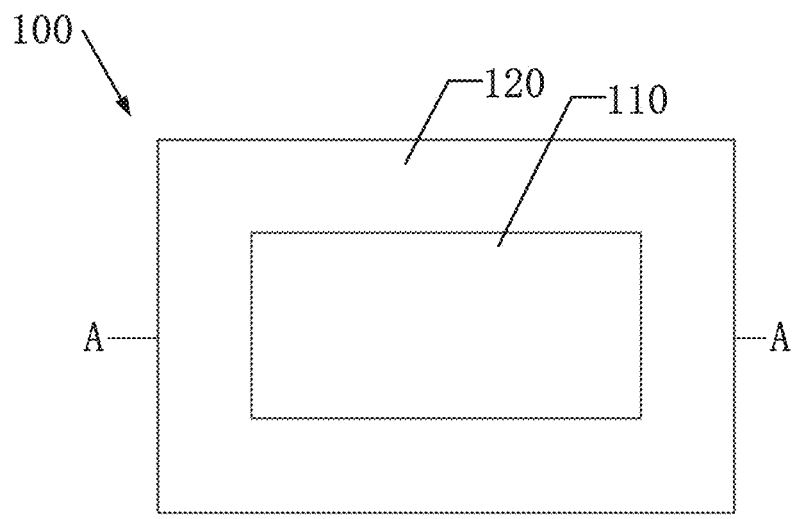
FIG. 1 is a plane schematic view of a complementary metal-oxide-semiconductor (CMOS) image chip of the present invention.

Indication of reference number of the attached drawings:
1000, camera; 2000, substrate to be inspected;
3000, light source; 4000, projection pattern
100, CMOS image chip; 200, lens;
110, photosensitive region; 120, light emitting region;
1, circuit layer; 2, underlay;
3, photodiodes; 4, the light emitting diodes;
5, anti-reflection layer; 6, encapsulation layer;
7, metal grid; 8, first planarization layer;
9, color resist unit; 10, second planarization layer;
11, lens elements;
101, first electrode; 102, second electrode;
103, third electrode; 201, fourth electrode;
202, second aperture; 203, first aperture;
401, substrate; 402, light emitting layer;
403, P-electrode; 404, N-electrode;
405, protrusion metal;
901, red color resist unit; 902, green color resist unit;
903, blue color resist unit.

DESCRIPTION OF SPECIFIC EMBODIMENTS OF THE INVENTION

Preferred embodiments of the present invention are described with accompanying drawings as follows introduce a person of ordinary skill in the art the technical contents of the present invention completely such that examples are used to prove that the present invention can be embodied. As such the published technologies of the present invention are made clearer such that a person of ordinary skill in the art can better understand the way to embody the present invention. However, the present invention can be embodied by embodiments of various forms, and the protective scope of the present invention is not only limited in the mentioned embodiment herein, and explanation of the following embodiments is not for limiting the scope of the present invention.

The terminologies of direction mentioned in the present invention, such as "upper", "lower", "front", "rear", "left", "right", "inner", "outer", "side surface", etc., only refer to the directions of the appended figures. Therefore, the terminologies of direction are used for explanation and comprehension of the present invention, instead of limiting the present invention.

In the drawings, elements with the same structures are indicated with the same numerals, and elements with similar structures or functions are indicated with similar numerals. Furthermore, for convenience of understanding and description, the dimension and thickness of each assembly in the drawings are depicted at arbitrarily, and the present invention has no limit to the dimension and thickness of each assembly.

First Embodiment

With reference to FIG. 1, the present embodiment provides a complementary metal-oxide-semiconductor (CMOS) image chip 100 comprising: a photosensitive region 110 and a light emitting region 120 surrounding the photosensitive region 110.

Figure 2:
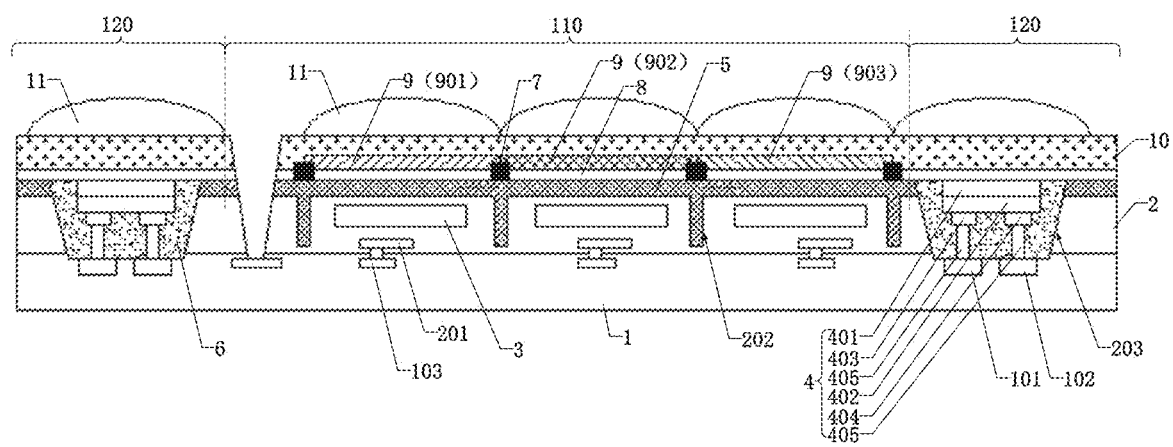
FIG. 2 is a cross-sectional schematic view along line A-A in FIG. 1.

With reference to FIG. 2, the CMOS image chip 100 comprises: a circuit layer 1, an underlay 2, a plurality of photodiodes 3, a plurality of light emitting diodes 4, anti-reflection layer 5, an encapsulation layer 6, metal grid 7, a first planarization layer 8, a color resist unit 9, a second planarization layer 10, and a lens elements 11.

The circuit layer 1 is located between the photosensitive region 110 and the light emitting region 120.

The underlay 2 is disposed on the circuit layer 1 of the photosensitive region 110. In the present embodiment, a material of the underlay 2 is silicon.

The photodiodes 3 is disposed on the underlay 2 of the photosensitive region 110 and is electrically connected to the circuit layer 1. In the present embodiment, circuit layer 1 has a plurality of third electrodes 103, and the underlay 2 has a plurality of fourth electrodes 201. The photodiodes 3 are electrically connected to the fourth electrodes 201. The third electrodes 103 are correspondingly bonded to the fourth electrodes 201 to achieve electrical connection of the photodiodes 3 with circuit layer 1. A second aperture 202 is defined between adjacent two of the photodiodes 3.

The light emitting diodes 4 are disposed on the circuit layer 1 of the light emitting region 120 and is electrically connected to the circuit layer 1. In the present embodiment, the light emitting diodes 4 are Micro LEDs, a size of the light emitting diode 4 is less than 50 um. In other embodiment, the light emitting diodes 4 can also be Mini LEDs. In the present embodiment, the light emitting diodes 4 are arranged into a shape of a double concentric circle surrounding the photosensitive region 110. In other embodiment, the light emitting diodes 4 can also surround two side edges of the photosensitive region 110 or be arranged at corners of the photosensitive region 110. A distance between the light emitting diodes 4 can be adjusted according to actual demands, and the present application has no limit thereto. The CMOS image chip 100 of the present invention comprises a photosensitive region 110 and a light emitting region 120 surrounding the photosensitive region 110. The light emitting diodes 4 are disposed in the light emitting region 120. According to a principle of reversibility of light, a projection pattern of the light emitting diodes 4 on a substrate to be inspected is used to determine a photosensitive effective region of the underlay 2 of the CMOS image chip 100 to prevent the issue that the conventional technology uses an image by camera imaging on a display device as debug basis and a camera imaging image has signal delay to result in a low debugging efficiency.

In the present embodiment, the underlay 2 is further disposed on the circuit layer 1 of the light emitting region 120. A first aperture 203 is defined in the underlay 2 in the light emitting region 120, the light emitting diodes 4 are located in the first aperture 203. The underlay 2 can prevent light emitted by the light emitting diodes 4 from the photodiodes 3 irradiating the photosensitive region 110, which prevents influence to reliability of the photodiodes 3. In other embodiment, the underlay 2 can also be not disposed on the circuit layer 1 of the light emitting region 120.

A length of a bottom edge of a side of the first aperture 203 near the circuit layer 1 is less than a length of a bottom edge of a side of the first aperture 203 away from the circuit layer 1. Namely, the first aperture 203 is inverted trapezoidal. Reflecting light emitted from the light emitting diodes 4 by a sidewall of the first aperture 203 improves collimation and light extraction rate of light emitted from the light emitting diodes 4.

Each of the light emitting diodes 4 comprises: a substrate 401, a light emitting layer 402, a P-electrode 403, a N-electrode 404, and a protrusion metal 405.

The light emitting layer 402 is disposed on a side of the substrate 401 facing the circuit layer 1.

The P-electrode 403 and the N-electrode 404 are disposed on a side of the light emitting layer 402 away from the substrate 401 at an interval. The circuit layer 1 corresponding to the first aperture 203 comprises a first electrode 101 and a second electrode 102 electrically connected to the P-electrode 403 and the N-electrode 404 respectively.

The protrusion metal 405 is disposed between the P-electrode 403 and the first electrode 101 and is disposed between the N-electrode 404 and the second electrode 102.

In the present embodiment, a height of the protrusion metal 405 is adjusted to make a surface of a side of the light emitting layer 402 of any one of the light emitting diodes 4 away from the circuit layer 1 flush with a surface of a side of the underlay 2 away from the circuit layer 1. Thus, according to the principle of reversibility of light, debugging effect to the light emitting diodes 4 are ensured to be consistent with the debugging effect to the photodiodes 3 on the underlay 2.

The anti-reflection layer 5 is disposed on a side of the underlay 2 away from the circuit layer 1. The anti-reflection layer 5 is further filled in the second aperture 202. The anti-reflection layer 5 can lower a reflectivity of ambient light irradiating to the underlay 2, and can also lower occurrence of a dark current phenomenon on the sidewall of the second aperture 202.

The encapsulation layer 6 is filled in the first aperture 203. The encapsulation layer 6 is configured to prevent water oxygen from invading the light emitting diodes 4 and improve a lifespan of the light emitting diodes 4.

Surfaces of the encapsulation layer 6, the light emitting diodes 4, and the anti-reflection layer 5 away from the circuit layer 1 are flush with one another. Namely, the anti-reflection layer 5 covers none of the light emitting diodes 4 and the encapsulation layer 6, which improves light extraction of the light emitting diodes 4.

The metal grid 7 is disposed on a side of the anti-reflection layer 5 away from the circuit layer 1 and is disposed to correspond to the second aperture 202. The metal grid 7 is mainly configured to lower an optical crosstalk phenomenon.

The first planarization layer 8 is disposed on sides of the anti-reflection layer 5, the light emitting diodes 4 and the encapsulation layer 6 away from the circuit layer 1. The first planarization layer 8 is mainly configured to provide a flat surface for later manufactured film layers.

The color resist unit 9 is disposed on a side of the first planarization layer 8 away from the circuit layer 1 between adjacent portions of the metal grid 7. The color resist unit 9 is mainly configured to filter ambient light irradiating the photodiodes 3. In the present embodiment, the color resist unit 9 comprises a red color resist unit 901, a green color resist unit 902, and a blue color resist unit 903.

The second planarization layer 10 is disposed on a side of the color resist unit 9 and the first planarization layer 8 away from the circuit layer 1. The second planarization layer 10 is mainly configured to provide a flat surface for later manufactured film layers.

A plurality of lens elements 11 is disposed on a side of the second planarization layer 10 away from the circuit layer 1 and is disposed to correspond to the color resist unit 9 and the light emitting diodes 4. A surface of a side of the lens elements 11 away from the circuit layer 1 is convex, and a surface of a side of the lens elements 11 near the circuit layer 1 is flat.

With reference to FIGS. 2 to 11, the present embodiment further provides a manufacturing method for the CMOS image chip 100 of the present embodiment, comprising steps as follows.

Figure 3:
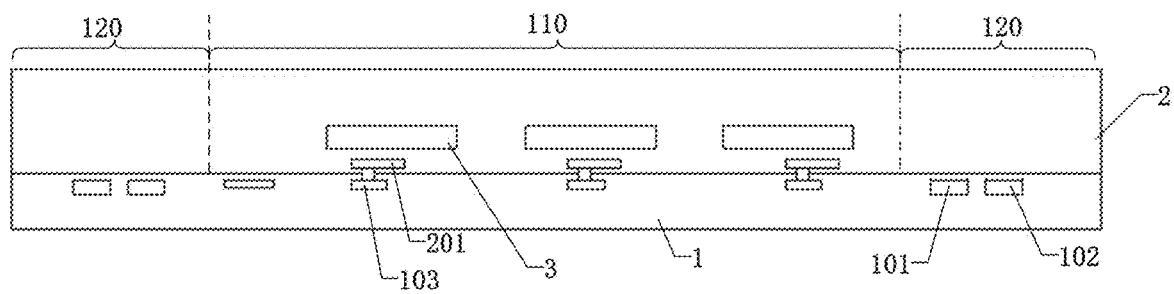
FIG. 3 is a schematic structural view of a first semi-product of the CMOS image chip of the present invention.

With reference to FIGS. 2 and 3, a plurality of the photodiodes 3 are manufactured on the underlay 2 in the photosensitive region 110, and then the underlay with the manufactured photodiodes 3 is disposed on the circuit layer 1. In particular, bonding the fourth electrodes 201 on the underlay 2 to the third electrodes 103 on the circuit layer 1 achieves electrical connection of the photodiodes 3 with the circuit layer 1 to form a first semi-product.

Figure 4:
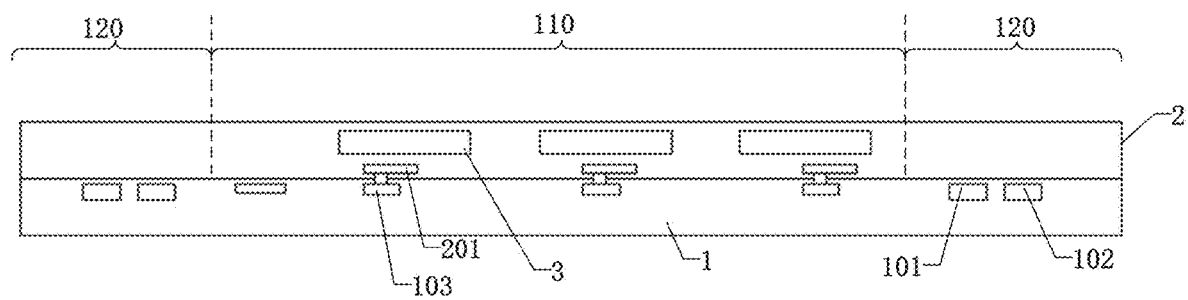
FIG. 4 is a schematic structural view of a second semi-product of the CMOS image chip of the present invention.

With reference to FIG. 4, the underlay 2 is thinned to form a second semi-product. In particular, a thickness of the silicon underlay of the underlay 2 can be reduced to lower a thickness of the CMOS image chip 100.

Figure 5:
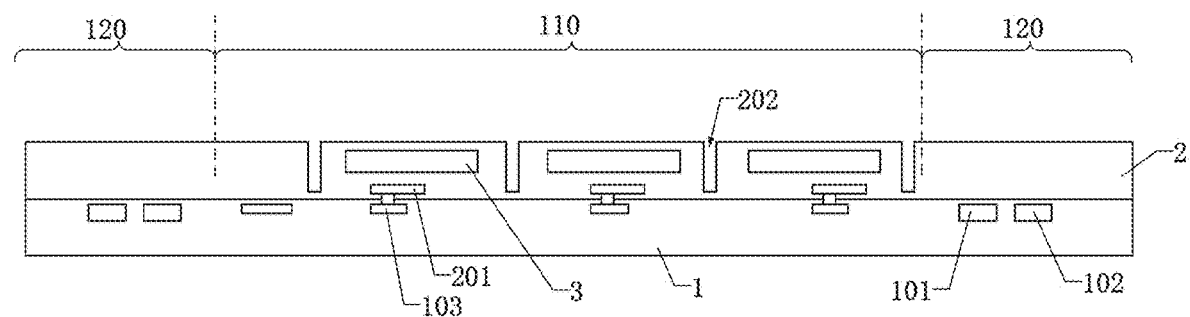
FIG. 5 is a schematic structural view of a third semi-product of the CMOS image chip of the present invention.

With reference to FIG. 5, by a deep trench isolation (DTI) process, a second aperture 202 is formed between adjacent two of the photodiodes 3 to form a third semi-product.

Figure 6:
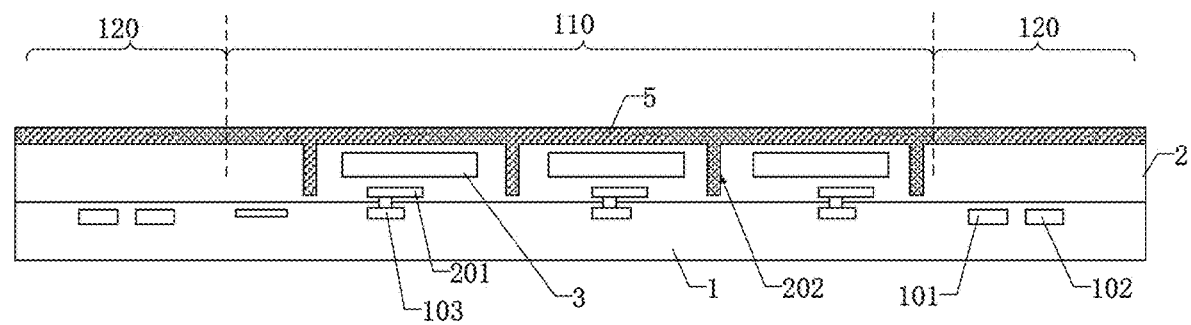
FIG. 6 is a schematic structural view of a fourth semi-product of the CMOS image chip of the present invention.

With reference to FIG. 6, an anti-reflection layer 5 is coated on the underlay 2 and in the second aperture 202 to form a fourth semi-product.

Figure 7:
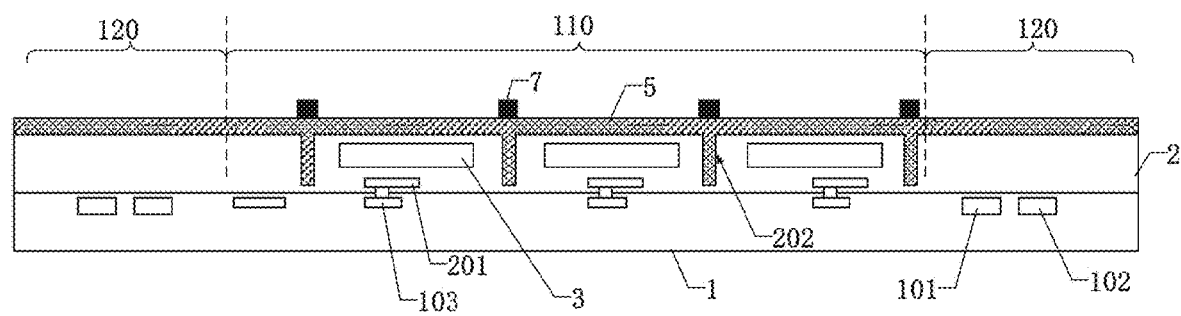
FIG. 7 is a schematic structural view of a fifth semi-product of the CMOS image chip of the present invention.

With reference to FIG. 7, the metal grid 7 is disposed on a portion of a side of the anti-reflection layer 5 away from the circuit layer 1 corresponding to the second aperture 202 to form a fifth semi-product.

Figure 8:
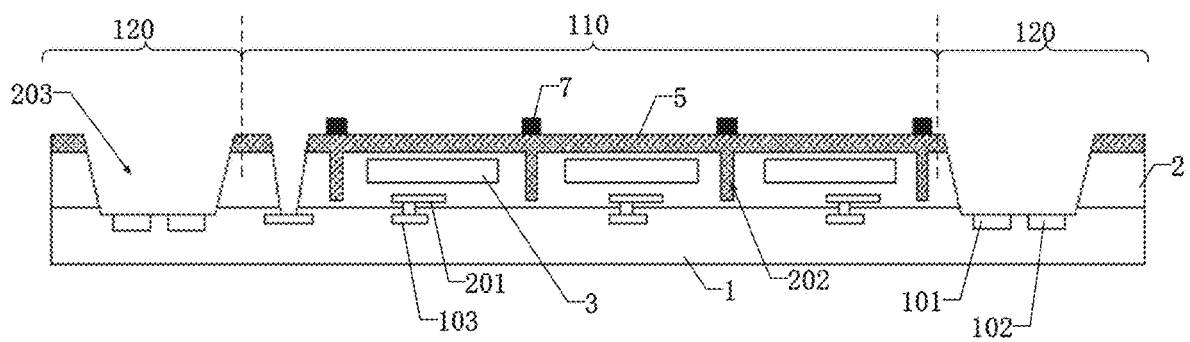
FIG. 8 is a schematic structural view of a sixth semi-product of the CMOS image chip of the present invention.

With reference to FIG. 8, a first aperture 203 is formed making holes in the anti-reflection layer 5 and the underlay 2 to form a sixth semi-product such that the first electrode 101 and the second electrode 102 on the circuit layer 1 are exposed for later electrical connection with the light emitting diodes 4.

Figure 9:
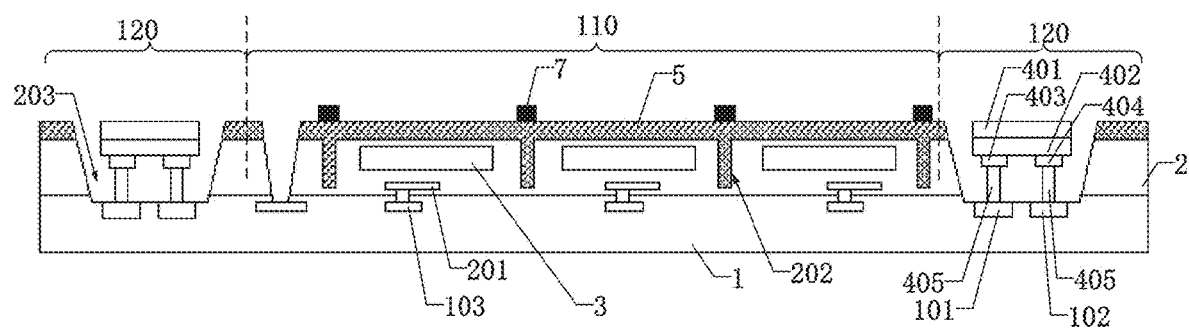
FIG. 9 is a schematic structural view of a seventh semi-product of the CMOS image chip of the present invention.

With reference to FIG. 9, the light emitting diodes 4 are welded on the circuit layer 1 by mass transfer and laser welding processes to form a seventh semi-product.

Figure 10:
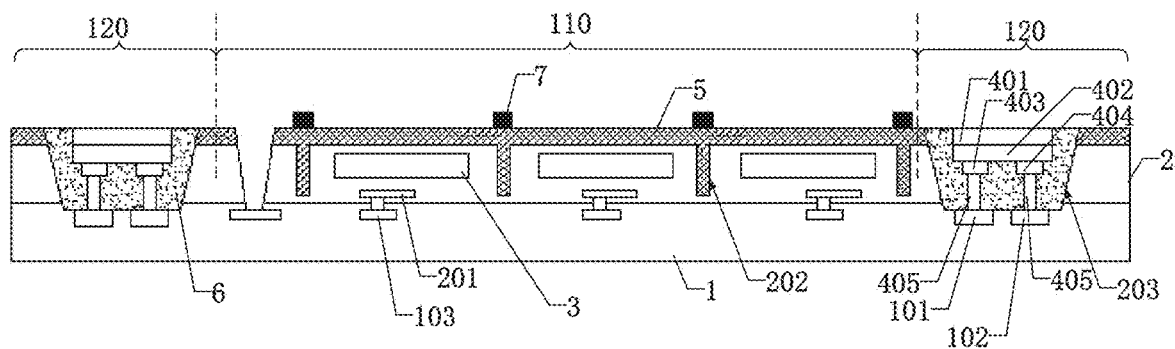
FIG. 10 is a schematic structural view of an eighth semi-product of the CMOS image chip of the present invention.

With reference to FIG. 10, 采a transparent material is filled in the first aperture 203 of the underlay 2 by an inkjet printing process to form the encapsulation layer 6. The encapsulation layer 6 is used to encapsulate the light emitting diodes 4 to form an eighth semi-product.

Figure 11:
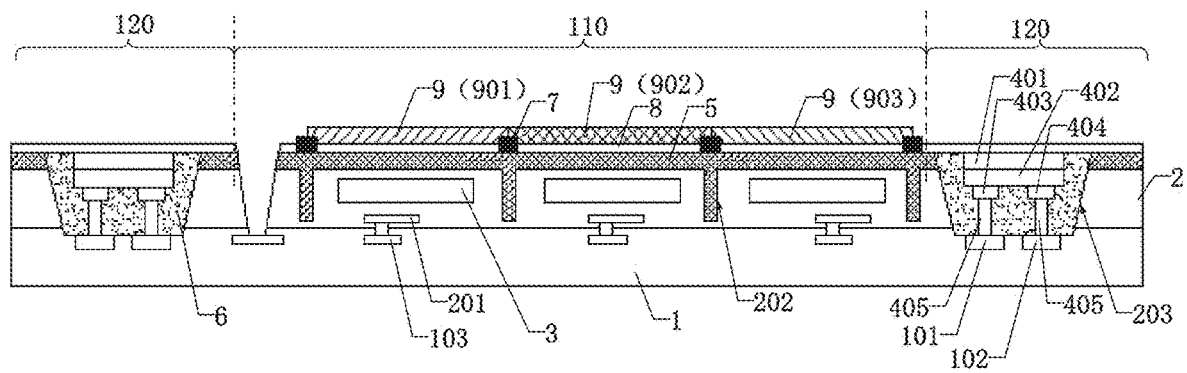
FIG. 11 is a schematic structural view of a ninth semi-product of the CMOS image chip of the present invention.

With reference to FIG. 11, the first planarization layer 8 is manufactured on sides of the anti-reflection layer 5, the light emitting diodes 4 and the encapsulation layer 6 away from the circuit layer 1. A color resist unit 9 is manufactured on a side of the first planarization layer 8 away from the circuit layer 1 between adjacent portions of the metal grid 7 to form a ninth semi-product.

With reference to FIG. 2, a second planarization layer 10 is manufactured on sides of the color resist unit 9 and the first planarization layer 8 away from the circuit layer 1. lens elements 11 are disposed on portions of a side of the second planarization layer 10 away from the circuit layer 1 corresponding to the color resist unit 9 and the light emitting diodes 4.

Figure 12:
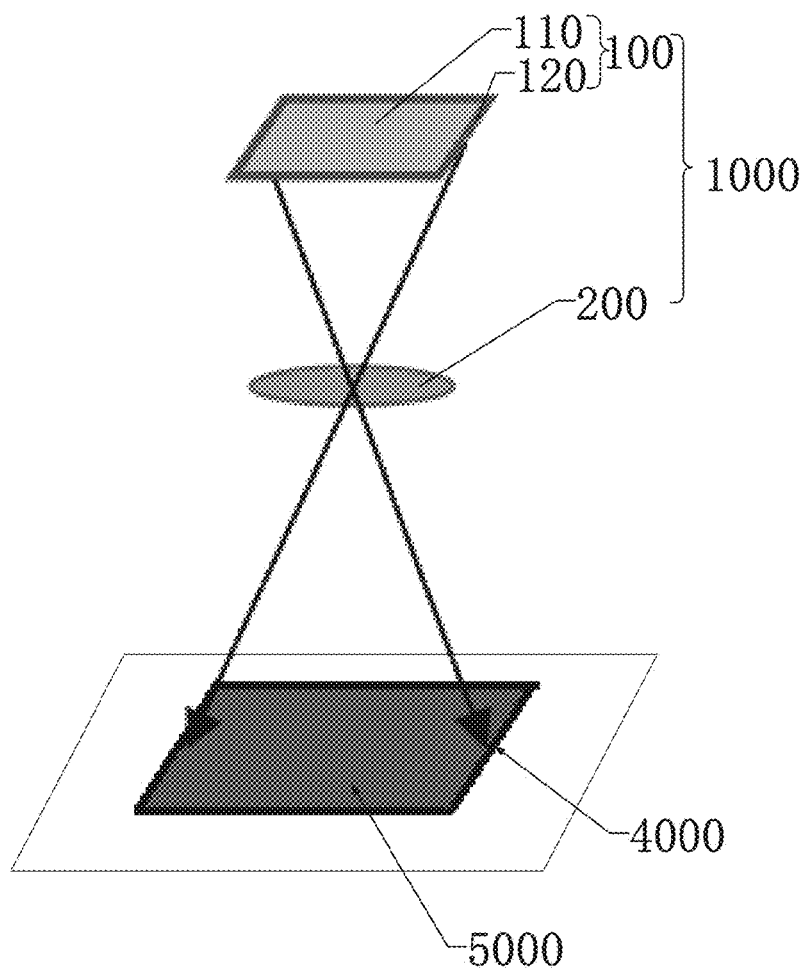
FIG. 12 is a schematic view of light of an area array camera of a first embodiment.

With reference to FIG. 12, the present embodiment further provides a camera 1000. The camera 1000 comprises a CMOS image chip 100 and a lens 200. In the present embodiment, the camera 1000 is an area array camera.

The present embodiment further provides a the camera debugging method of the present embodiment, comprising steps as follows: projecting a display image of the light emitting diodes 4 of the CMOS image chip 100 through the lens 200 and to a substrate to be inspected 2000 to form a projection pattern 4000, observing a clarity of the projection pattern 4000 on the substrate to be inspected 2000 and adjusting a focus length of the lens 200 by a user, wherein the user observes a clarity of a plurality of point positions of the projection pattern 4000 of the substrate to be inspected 2000 and adjusts a level of the camera 1000. As such, a debugging efficiency of the camera 1000 can be improved drastically. In particular, the user observes clarity of four corners of the projection pattern 4000 of the substrate to be inspected 2000 and adjusts the level of the camera 1000.

The present embodiment, according to the principle of reversibility of light, uses the projection pattern 4000 of the light emitting diodes 4 on the substrate to be inspected 2000 to determine the photosensitive effective region 5000 of the underlay of the CMOS image chip to prevent the issue that the conventional technology uses an image by camera imaging on a display device as debug basis and a camera imaging image has signal delay to result in a low debugging efficiency.

Second Embodiment

Figure 13:
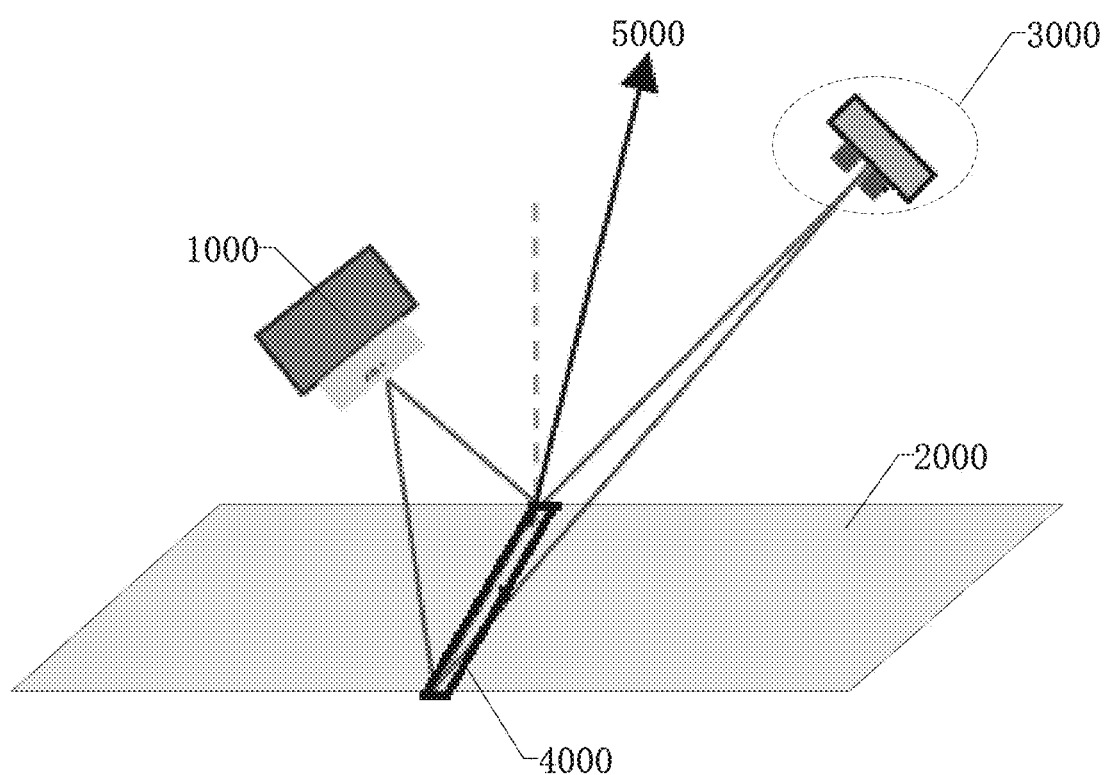
FIG. 13 is a schematic view of light of a linear array camera of a second embodiment.

With reference to FIG. 13 the, the present embodiment comprises most of features of the first embodiment. A difference of the present embodiment from the first embodiment is that the camera 1000 of the present embodiment is the linear array camera. The camera debugging method further of the present embodiment comprises a step as follows: by a user observing a position of reflective light from light emitted from the light emitting diodes 4 reflected by the substrate to be inspected, determining a placement position and an angle of a light source 3000, and adjusting a bright and dark field imaging mode of the camera 1000.

The CMOS image chip, camera, and debugging method thereof of the present application are described in detail as above. In the specification, the specific examples are used to explain the principle and embodiment of the present application. The above description of the embodiments is only used to help understand the method of the present application and its spiritual idea. Meanwhile, for those skilled in the art, according to the present idea of invention, changes will be made in specific embodiment and application. In summary, the contents of this specification should not be construed as limiting the present application.

What is claimed is:

1. A complementary metal-oxide-semiconductor (CMOS) image chip, comprising: a photosensitive region and a light emitting region surrounding the photosensitive region;
   wherein the CMOS image chip comprises:
   a circuit layer located in the photosensitive region and the light emitting region;
   a plurality of photodiodes disposed on the circuit layer of the photosensitive region and electrically connected to the circuit layer; and
   a plurality of the light emitting diodes disposed on the circuit layer of the light emitting region and electrically connected to the circuit layer;
   wherein an underlay is disposed on the circuit layer in the photosensitive region, and the photodiodes are disposed on the underlay of the photosensitive region;
   wherein the underlay is further disposed on the circuit layer in the light emitting region, the underlay in the light emitting region comprises a first aperture, and the light emitting diodes are located in the first aperture;
   wherein each of the light emitting diodes comprises: a substrate, a light emitting layer disposed on a side of the substrate toward the circuit layer, a P-electrode and a N-electrode disposed on a side of the light emitting layer away from the substrate at an interval;

wherein the circuit layer corresponding to the first aperture comprises a first electrode and a second electrode electrically connected to the P-electrode and the N-electrode respectively;

wherein the CMOS image chip further comprises:

an anti-reflection layer disposed on a side of the underlay away from the circuit layer; a second aperture is defined between adjacent two of the photodiodes, and the anti-reflection layer is further filled in the second aperture; and an encapsulation layer filled in the first aperture;

wherein surfaces of sides of the encapsulation layer, the light emitting diodes, and the anti-reflection layer away from the circuit layer are flush with one another.

2. The CMOS image chip according to claim 1, wherein the light emitting diodes are Micro light emitting diodes (LEDs) or Mini LEDs.

3. The CMOS image chip according to claim 1, wherein each of the light emitting diodes further comprises a protrusion metal disposed between the P-electrode and the first electrode and disposed between the N-electrode and the second electrode.

4. The CMOS image chip according to claim 3, wherein a surface of a side of the light emitting layer of one of the light emitting diodes away from the circuit layer is flush with a surface of a side of the underlay away from the circuit layer.

5. The CMOS image chip according to claim 1, wherein the CMOS image chip further comprises:

a metal grid disposed on a portion of a side of the anti-reflection layer away from the circuit layer corresponding to the second aperture;

a first planarization layer disposed on a side of the anti-reflection layer, the light emitting diodes and the encapsulation layer away from the circuit layer;

a color resist unit disposed on a side of the first planarization layer between adjacent portions of the metal grid away from the circuit layer;

a second planarization layer disposed on a side of the color resist unit and the first planarization layer away from the circuit layer; and a plurality of lens elements disposed on a side of the second planarization layer away from the circuit layer and disposed opposite to the color resist unit and the light emitting diodes.

6. The CMOS image chip according to claim 1, a length of bottom edge of a side of the first aperture near the circuit layer is less than a length of a bottom edge of a side of the first aperture away from the circuit layer.

7. A camera, comprising a complementary metal-oxide-semiconductor (CMOS) image chip and a lens;

wherein the camera comprises one of an area array camera and a linear array camera;

wherein the CMOS image chip comprises: a photosensitive region and a light emitting region surrounding the photosensitive region;

wherein the CMOS image chip comprises:

a circuit layer located in the photosensitive region and the light emitting region;

a plurality of photodiodes disposed on the circuit layer of the photosensitive region and electrically connected to the circuit layer; and a plurality of the light emitting diodes disposed on the circuit layer of the light emitting region and electrically connected to the circuit layer;

wherein an underlay is disposed on the circuit layer in the photosensitive region, and the photodiodes are disposed on the underlay of the photosensitive region;

wherein the underlay is further disposed on the circuit layer in the light emitting region, the underlay in the light emitting region comprises a first aperture, and the light emitting diodes are located in the first aperture;

wherein each of the light emitting diodes comprises: a substrate, a light emitting layer disposed on a side of the substrate toward the circuit layer, a P-electrode and a N-electrode disposed on a side of the light emitting layer away from the substrate at an interval;

wherein the circuit layer corresponding to the first aperture comprises a first electrode and a second electrode electrically connected to the P-electrode and the N-electrode respectively;

wherein the CMOS image chip further comprises:

an anti-reflection layer disposed on a side of the underlay away from the circuit layer; a second aperture is defined between adjacent two of the photodiodes, and the anti-reflection layer is further filled in the second aperture; and an encapsulation layer filled in the first aperture;

wherein surfaces of sides of the encapsulation layer, the light emitting diodes, and the anti-reflection layer away from the circuit layer are flush with one another.

8. The camera according to claim 7, wherein the light emitting diodes are Micro light emitting diode (LEDs) or Mini LEDs.

9. The camera according to claim 7, wherein each of the light emitting diodes further comprises a protrusion metal disposed between the P-electrode and the first electrode and disposed between the N-electrode and the second electrode; and a surface of a side of the light emitting layer of one of the light emitting diodes away from the circuit layer is flush with a surface of a side of the underlay away from the circuit layer.

10. The camera according to claim 7, wherein the CMOS image chip further comprises:

a metal grid disposed on a portion of a side of the anti-reflection layer away from the circuit layer corresponding to the second aperture;

a first planarization layer disposed on a side of the anti-reflection layer, the light emitting diodes and the encapsulation layer away from the circuit layer;

a color resist unit disposed on a side of the first planarization layer between adjacent portions of the metal grid away from the circuit layer;

a second planarization layer disposed on a side of the color resist unit and the first planarization layer away from the circuit layer; and a plurality of lens elements disposed on a side of the second planarization layer away from the circuit layer and disposed opposite to the color resist unit and the light emitting diodes.

* * * * *